Patented July 4, 1950

2,513,529

UNITED STATES PATENT OFFICE 2,513,529

METHOD FOR PRODUCTION OF A NICKEL-SILICA-SULFUR CATALYST

František Stejškal, near Litomerice, Czechoslovakia, assignor to Sana, Narodni Podnik, Prague, Czechoslovakia, a company of Czechoslovakia No Drawing. Application May 22, 1947, Serial No. 749,882. In Germany May 31, 1943

Section 1, Public Law 690, August 8, 1946
Patent expires May 31, 1963

7 Claims. (Cl. 252—439)

This invention relates to a method for the production of a catalyser, especially one that is suitable for the refining of drying or semi-drying oils, including train oil.

According to the invention nickel silicate and a nickel combination containing sulphur, is subjected at high temperature to a reduction treatment preferably with the aid of hydrogen. Preferably, nickel sulphate is used as the nickel combination containing sulphur.

In a preferred form of carrying out the invention metallic nickel is produced in active form at the same time. This can be done, for example, by precipitating a nickel combination containing sulphur with alkali, the deposit obtained being converted, in the reduction, to metallic nickel.

In carrying out the method according to the invention nickel silicate may also be produced by precipitation from a nickel salt soluble in water, e. g. nickel sulphate, with the aid of water-glass solution or the like. At the same time, a nickel combination, such as nickel carbonate or nickel hydroxide, is also deposited, for example by the addition of sodium carbonate or sodium hydroxide solution, so that, at the later reduction, metallic nickel and nickel silicate can be obtained from these deposits.

The catalysers are preferably reduced to a finely ground condition. After reduction with hydrogen they are displaced by an inert gas, such as $CO_2$ free from oxygen. The catalyser is kept in oil, while the entry of air is carefully avoided.

For the purpose of hydrogenation, there are many known catalysts, among these nickel as well as nickel silicates in various combinations and concentrations. Further U. S. Pat. 2,265,388 teaches the impregnation of silicic carriers with nickel sulfate for the manufacture of a catalyst used in the production of more suitable qualities of gasoline. In this method, however, nickel sulfate is used only to achieve uniform distribution of the nickel on the carrier, and subsequent hydrolysis displaces the sulfating component so that the $SO_4$ ion can be substantially washed away and the catalyst used without having to be reduced.

In contradistinction to all these catalysts, the present invention provides a catalyst containing nickel silicate, active nickel and a characteristically low percentage of inherent sulfur. It is to be assumed that the active nickel constitutes the catalyst proper, while the nickel silicate is merely a superficial agent and the sulfur a promoter. Catalysts of this nature, which contain no sulfur, constitute perfect hardening catalysts, but for certain catalytic reactions, for example the displacement of isolated double bonds of oxygen-active fatty acids to a conjugated position, they are quite unsuited or come into consideration in technically unsound proportions. When they contain sulfur, however, which acts as a promoter, the qualities of the hydrogenation catalyst are considerably reduced, but other reactions, particularly the aforementioned transfer of isolated double bonds, can be very considerably enhanced.

Example 1

An aqueous nickel sulphate solution is precipitated, with a diluted water-glass solution, at 70–80° C. up to alkaline reaction. The precipitated nickel silicate is filtered off and washed practically free from alkali. In order to incorporate the sulphur, the cake produced is then mixed with such an amount of nickel sulphate solution that the whole cake mass contains about 5 parts of sulphur, to 95 parts of nickel. It is then dried, finely ground and reduced at about 300–500° C. with hydrogen.

Example 2

Nickel sulphate dissolved in water is precipitated at 70–80° C. with soda solution and water-glass solution with a slight surplus. The precipitated nickel carbonate silicate, after filtration, is washed practically free from alkali and is then mixed with an aqueous solution of nickel sulphate. The addition of nickel sulphate is so measured that approximately 5% of sulphur comes to the nickel present in the cake. The mash is then dried, ground and reduced.

Example 3

A concentrated aqueous solution of nickel sulphate is mixed with kieselguhr in the ratio of 2 parts nickel to one part of kieselguhr and precipitated at 70–80° C. with a concentrated solution of sodium carbonate with a slight surplus. The precipitated nickel carbonate is carefully washed free from alkali and sulphate and the cake of nickel carbonate deposited is then boiled with a 2% soda solution for three hours and washed free from alkali. The wet cake containing nickel silicate, nickel carbonate and kieselguhr which is thus obtained is mixed with an aqueous solution of nickel sulphate. In doing so the amount of the newly added nickel sulphate is so measured that the amount of sulphur added by the nickel sulphate is about 5%, calculated on the total nickel contents of the mass. The cake obtained is dried, finely ground and reduced in a stream of hydrogen at about 300–500° C.

*Example 4*

An aqueous solution of nickel sulphate is mixed with kieselguhr and then precipitated, at 70–80° C., with a solution of soda and a solution of water-glass up to alkaline reaction. The precipitate is filtered off, washed free from alkali and then mixed with a solution of nickel sulphate. The amount of the nickel sulphate added is such that sulphur is present in the proportion of about 5% of the total amount of nickel present in the cake. It is then dried, ground and reduced with hydrogen.

The catalyser according to the invention can be used with particular advantage for carrying out the refining of drying or semi-drying oils, including fish-oils and train oils, by heating in such a way that the regrouping of the double linkages of the oil to conjugated double linkages reaches a maximum, and the polymerization (thickening) a minimum.

I claim:

1. Method of producing a catalyser for refining, drying and semi-drying oils and train-oils comprising the steps of mixing an aqueous solution of nickel salt with kieselguhr; precipitating the mix with a solution of sodium carbonate; thoroughly washing the precipitate, boiling it with a soda solution and then washing it again; mixing the mass thus obtained with a quantity of nickel sulfate in aqueous solution, drying it, grinding it, and reducing it at a temperature of about 300–500° C. in a stream of a hydrogen.

2. Method as claimed in claim 1 in which a water-glass solution is added to the sodium carbonate solution.

3. Method of producing a catalyser for refining, drying and semi-drying oils and train-oils in which nickel silicate mixed with nickel sulfate before drying is subjected to a substantially complete reduction at a temperature of about 300–500° C. in hydrogen.

4. Method of producing a catalyser for refining, drying, semi-drying oils and train-oils in which nickel silicate admixed with nickel sulfate before drying, is subjected to a substantially complete reduction treatment at a temperature of about 300–500° C.

5. Method of producing a catalyser for refining, drying, semi-drying and train-oils comprising the steps of precipitating an aqueous nickel salt solution with a water-glass solution, washing the deposit thus obtained free from alkali, mixing the deposit with nickel sulfate in aqueous solution, drying the deposit, grinding it, and then subjecting it to a substantially complete reduction treatment by heat of about 300–500° C.

6. Method as claimed in claim 5 in which alkali carbonate is added to the water-glass solution.

7. Method as claimed in claim 5 in which alkali hydroxide is added to the water-glass solution.

FRANTIŠEK STEJŠKAL.

REFERENCES CITED

The following references are of record in the file of this patent:

UNITED STATES PATENTS

| Number | Name | Date |
|---|---|---|
| 1,004,034 | Kayser | Sept. 26, 1911 |
| 1,143,332 | Sulzberger | June 15, 1915 |
| 1,282,296 | Schwarcman | Oct. 22, 1918 |
| 1,282,297 | Schwarcman | Oct. 22, 1918 |
| 1,882,146 | Holmes | Oct. 11, 1932 |
| 2,246,037 | Gallagher | June 17, 1941 |
| 2,265,388 | Melaven et al. | Dec. 9, 1941 |
| 2,273,297 | Szayna | Feb. 17, 1942 |